United States Patent [19]

Ramlow et al.

[11] 3,931,092

[45] Jan. 6, 1976

[54] FINELY-DIVIDED POLYMERIC SOLIDS HAVING IMPROVED PHYSICAL PROPERTIES

[75] Inventors: Gerhard G. Ramlow, East Windsor, N.J.; Louis C. Pizzini, Trenton, Mich.; John T. Patton, Jr., Wyandotte, Mich.; John R. Murphy, Trenton, Mich.

[73] Assignee: BASF Wyandotte Corporation, Wyandotte, Mich.

[22] Filed: Apr. 29, 1974

[21] Appl. No.: 465,234

[52] U.S. Cl....... 260/33.4 R; 260/30.2; 260/30.4 R; 260/30.8 DS; 260/31.2 XA; 260/31.4 R; 260/32.2; 260/32.4; 260/32.6; 260/32.8 R; 260/33.2 R; 260/33.4 EP; 260/33.6 R; 260/33.6 UA; 260/75 NK; 260/75 UA; 260/78.5 B; 260/78.5 E; 260/78.5 HC; 260/78.5 CL; 260/80 M; 260/80 P; 260/80.3 E; 260/80.75; 260/861; 260/862; 260/875

[51] Int. Cl.².............. C08F 216/02; C08F 267/06; C08F 2/12

[58] Field of Search...... 260/75 UA, 75 NK, 78.5 B, 260/78.5 E, 78.5 HC, 78.5 CL, 862, 861, 80.3 E, 80.75, 875, 33.4 R, 33.4 EP, 80 M, 80 P

[56] References Cited
UNITED STATES PATENTS

| | | | |
|---|---|---|---|
| 2,851,379 | 9/1958 | Staudinger et al. | 117/161 |
| 3,089,863 | 5/1963 | Hicks et al. | 260/75 |
| 3,222,421 | 12/1965 | Lundberg | 260/872 |
| 3,652,489 | 3/1972 | Crowe et al. | 260/40 R |
| 3,718,714 | 2/1973 | Comstock | 260/862 |

*Primary Examiner*—John Kight, III
*Attorney, Agent, or Firm*—Joseph D. Michaels; Bernhard R. Swick; Robert E. Dunn

[57] ABSTRACT

Finely-divided dispersed solids are prepared by polymerizing in the presence of a free radical catalyst and an organic solvent a major amount of an ethylenically unsaturated monomer or mixture of monomers and a minor amount of a hydroxy-terminated organic compound having from one to eight hydroxyl groups, an equivalent weight of from 500 to 10,000 and containing a polymerizable carbon-to-carbon double bond. The resulting polymeric solids are particularly useful in the preparation of reinforced polymer compositions.

21 Claims, No Drawings

FINELY-DIVIDED POLYMERIC SOLIDS HAVING IMPROVED PHYSICAL PROPERTIES

BACKGROUND OF THE INVENTION

1. Field Of The Invention

The present invention relates to finely-divided, hydroxy-containing polymeric solids having a particle size of from about 0.03 micron to 10 microns. More particularly, the invention relates to finely-divided hydroxy-containing polymeric solids prepared by polymerizing in the presence of a free radical catalyst and an organic solvent a major amount of an ethylenically unsaturated monomer or mixture of monomers and a minor amount of a hydroxy-terminated organic compound having from one to eight hydroxylgroups, an equivalent weight of from 500 to 10,000 and containing a polymerizable carbon-to-carbon double bond.

2. Prior Art

The preparation of finely-divided polymeric solids by polymerizing an ethylenically unsaturated monomer in the presence of various solvents is well known in the art. Heretofore, however, applicants are unaware of any prior art which relates to the hydroxy-containing polymeric solids of the type described herein nor to any process for the preparation thereof.

SUMMARY OF THE INVENTION

Now in accordance with the present invention, hydroxy-containing finely-divided dispersed polymeric solids are prepared by polymerizing in the presence of a free radical catalyst and an organic solvent a major amount of an ethylenically unsaturated monomer or mixture of monomers and a minor amount of a hydroxy-terminated organic compound having from one to eight hydroxyl groups, an equivalent weight of from 500 to 10,000 and containing a polymerizable carbon-to-carbon double bond. The polymeric solids of the invention are particularly useful in the preparation of reinforced polymer compositions to enhance the physical properties thereof. The solids also possess surface active properties which finds them useful in numerous applications such as opacifying agents for liquid detergent formulations. Moreover, they also find utility in coating compositions and as flocculants, draining agents and dispersing agents.

DESCRIPTION OF THE PREFERRED EMBODIMENTS

In accordance with the present invention, novel hydroxy-containing polymeric solids are prepared by polymerizing a major amount of an ethylenically unsaturated monomer and a minor amount of certain hydroxy-terminated organic compounds in the presence of a free radical catalyst and an organic solvent. The polymerization may be carried out at a temperature between 25°C. and 180°C., preferably between 60°C. and 90°C. The particular temperature employed will depend primarily on the organic solvent used and whether atmospheric or non-atmospheric conditions are selected.

One of the ingredients employed in the present invention is an ethylenically unsaturated monomer or a mixture of said monomers. Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, ethyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl methoxy acetate, vinyl benzoate, vinyl iodide, vinyl toluene, vinyl naphthalene, vinyl bromide, vinyl fluoride, vinylidene bromide, vinyl chloride, 1-chloro-1-fluoroethylene, vinylidene fluoride, vinylidene chloride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis (β-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. As mentioned above, the monomer ingredient is employed in major amounts, that is, the monomer ingredient comprises more than 50% by weight of the monomer and hydroxy-terminated organic compound. Generally, the monomer ingredient will be from about 55% to 95%, preferably from about 60% to 80%, by weight based on the total weight of monomer and hydroxy-terminated ingredients.

Another ingredient employed in the invention is a hydroxy-terminated organic compound containing a polymerizable carbon-to-carbon double bond. The hydroxy-terminated organic compounds of use in the invention have an equivalent weight of from 500 to 10,000 and have from one to eight hydroxyl groups. These compounds are well known in the art and are generally prepared by the reaction of an organic compound having from one to eight hydroxyl groups with an organic compound having both ethylenic unsaturation and a hydroxyl, carboxyl, or epoxy group. They may also be prepared by employing an organic compound having both ethylenic unsaturation and a hydroxyl, carboxyl, or epoxy group as a reactant in the preparation of the organic compound having from one to eight hydroxyl groups. Furthermore, the hydroxy-terminated organic compounds may be prepared by the reaction of a suitable organic compound having from two to eight hydroxyl groups with a monoester, a halogen-containing compound or an isocyanate-terminated compound, each of which contains a polymerizable carbon-to-carbon double bond, or with a compound, such as acetylene, which upon reaction yields a polymerizable carbon-to-carbon double bond.

Specifically, the hydroxy-terminated organic compounds may be prepared (1) by the reaction of an organic compound having from one to eight hydroxyl groups with a compound such as maleic anhydride; (2) by employing a compound such as allyl glycidylether in the preparation of the organic compound having from one to eight hydroxyl groups; (3) by the transesterification reaction of an organic compound having from two to eight hydroxyl groups with ethyl acrylate, methyl methacrylate, or a similar compound, or by the esterification of the said organic compound with acrylic acid, methacrylic acid, etc.; (4) by the reaction of the sodium or potassium metal salt of an organic compound having from two to eight hydroxyl groups with allyl chloride or vinyl chloride; or (5) by the reaction of the subject organic compounds with acetylene. Additionally, the product of the reaction of toluene diisocyanate with a compound having an active hydrogen and a polymerizable carbon-to-carbon double bond such as 2-hydroxypropyl methacrylate may be reacted with an organic compound having from two to eight hydroxyl groups to yield a hydroxy-terminated organic compound containing a polymerizable carbon-to-carbon double bond. Alternatively, a similar compound may be prepared by treating the prepolymer resulting from the reaction of toluene diisocyanate with an organic compound having from two to eight hydroxyl groups with compounds such as 2-hydroxyethyl acrylate, 4-hydroxybutyl acrylate and the like.

Representative of the organic compounds having both ethylenic unsaturation and a hydroxyl, carboxyl or epoxy group which may be used include unsaturated polycarboxylic acids and anhydrides such as maleic acid and anhydride, fumaric acid, crotonic acid and anhydride, propenyl succinic anhydride, and halogenated maleic acids and anhydrides; unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol; unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxy-propylene oxide (allyl glycidylether). If a polycarboxylic acid or anhydride is employed to incorporate unsaturation into the compounds, it is then preferred to react the resulting compounds with an alkylene oxide, preferably ethylene or propylene oxide, to replace the carboxyl groups with hydroxyl groups prior to employment in the present invention. The amount of alkylene oxide employed is such to reduce the acid number of the hydroxyterminated organic compound to about one or less. Representative ester-containing compounds containing a polymerizable carbon-to-carbon double bond include methyl acrylate, ethyl acrylate, propyl acrylate, n-butyl acrylate, and the corresponding methacrylates. Representative halogen-containing compounds containing a polymerizable carbon-to-carbon double bond include vinyl chloride, allyl chloride, acrylyl chloride, methacrylyl chloride, vinyl bromide, allyl bromide, acrylyl bromide and methacrylyl bromide.

Representative organic compounds which may be employed in the preparation of the hydroxy-terminated organic compounds employed in the present invention are well known in the art. They are often prepared by the catalytic condensation of an alkylene oxide or mixture of alkylene oxides either simultaneously or sequentially with an organic compound having from one to eight active hydrogen atoms such as evidenced by U.S. Pat. Nos. 1,922,451; 3,190,927, and 3,346,557.

Representative compounds having from one to eight active hydrogen atoms include hydroxy-containing polyesters, hydroxy-containing polyalkylene polyethers, hydroxy-terminated polyurethane polymers, hydroxy-containing phosphorus compounds, and alkylene oxide adducts of mono- and polyhydric thioethers, acetals, aliphatic alcohols, polyols and thiols, ammonia, and primary and secondary amines including aromatic, aliphatic and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used.

Any suitable hydroxy - containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-(4,4'-hydroxyphenyl)-propane, commonly known as Bisphenol A.

Any suitable hydroxy-containing polyalkylene polyether may be used such as the polymerization product of an alkylene oxide or of an alkylene oxide with a mono- or polyhydric alcohol having from one to eight hydroxyl groups. Any suitable polyhydric alcohol may be used such as those disclosed above for use in the preparation of the hydroxy-containing polyesters as well as monohydric alcohols such as methanol, ethanol, propanol, butanol and higher aliphatic alcohols containing up to twenty carbon atoms. Any suitable alkylene oxide may be used such as ethylene oxide, propylene oxide, butylene oxide, amylene oxide, and heteric or block copolymers of these oxides. The hydroxy-containing polyalkylene polyethers may be prepared from other starting materials such as tetrahydrofuran and alkylene oxide-tetrahydrofuran copolymers; epihalohydrins such as epichlorohydrin; as well as aralkylene oxides such as styrene oxide. The hydroxy-containing polyalkylene polyethers may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 500 to 10,000.

Preferred hydroxy-containing polythioethers which may be condensed with alkylene oxides include the condensation product of thiodiglycol or the reaction product of a dihydric alcohol such as is disclosed above for the preparation of the hydroxy-containing polyesters with any other suitable thioether glycol.

The hydroxy-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxy-containing polyester with only a portion of the components being a diamine such as ethylenediamine.

Polyhydroxy-containing phosphorus compounds which may be used include those compounds disclosed in U.S. Pat. No. 3,639,542. Preferred polyhydroxy-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols such as ethane thiol, propane thiol, pentane thiol, 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diamino naphthalene, methylene dianiline, the condensation products of aniline and formaldehyde, and 2,4-diamino toluene; aliphatic amines such as methylamine, diethylamine, dipropylamine, triisopropanolamine, ethylenediamine, 1,3-propylenediamine, 1,4-butylenediamine, and 1,3-butylenediamine.

To prepare the hydroxy-terminated organic compounds of use in the present invention, from about 1.0 mole to about 6.0 moles, preferably from 1.0 mole to 2.0 moles, of the unsaturation-containing organic compound per mole of organic compound having from one to eight reactive hydrogen atoms is employed. The preparation of the compounds employed in the present invention follows conventional prior art procedures such as disclosed in U.S. Pat. Nos. 3,275,606 and 3,280,077. Generally, this requires a reaction at a temperature between 0°C. and 150°C. Both acidic catalysts, such as Lewis acid catalysts and basic catalysts such as alkali metal hydroxides, may be used. In addition, a non-catalyzed reaction may be used employing temperatures between 50°C. and 200°C.

As mentioned above, the polymerization reaction of the invention occurs in the presence of a free radical catalyst and an organic solvent. The use of the organic solvent allows for the preparation of the solid polymers of the present invention. If the organic solvent is not employed, it is not possible to obtain the solid polymers in finely-divided form. Moreover, it was highly surprising to find that the use of the organic solvent allowed for the preparation of finely-divided hydroxy-containing polymeric solids derived from a major amount of ethylenically unsaturated monomers. If the polymerization of the monomer is carried out in the absence of a solvent, the maximum amount of ethylenically unsaturated monomer which can be employed is about thirty weight percent, based on the monomer and hydroxy-containing ingredients. With greater than thirty weight percent of monomer, gummy masses or extremely viscous products are obtained.

To be useful in the present invention, the solvent should have a boiling point of from 25°C. to 250°C. at ambient pressure. Representative organic solvents which may be employed in the process of the subject invention include aliphatic, alicyclic and aromatic hydrocarbons, alcohols, esters, ketones, amides, amines, ethers, nitriles, sulfoxides, and the corresponding nitro- and halo-substituted derivatives thereof. Exemplary of these solvents include pentane, hexane, heptane, nonane, undecane, dodecane, petroleum ether, methanol, ethanol, isopropanol, t-butanol, benzyl alcohol, acetone, propanone, butanone, methylethylketone, ethylbutylketone, acetophenone, benzene, naphthalene, toluene, 1,2,4-trimethylbenzene, ethylacetate, isopropylacetate, butylacetate, the acetate ester of the butyl ether of diethylene glycol, diethylene glycol monomethyl ether, carbon tetrachloride, chloroform, chlorobenzene, trichloroethylene 1,1,1-trichloro-1,1,1-trifluoroethane, trifluorochloromethane, dimethylformamide, dimethylsulfoxide, tetrahydrofuran, bis(2-methoxyethylether) benzonitrile, 2-nitropropane, nitrobenzene and acetonitrile. Mixtures of the above solvents may also be employed. As is apparent, the particular solvent employed is not critical to the process of the subject invention. The preferred group of solvents are the aliphatic alcohols having from one to four carbon atoms such as methanol, ethanol, propanol, isopropanol and t-butanol.

Illustrative catalysts which may be employed in the present invention are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, dilauroyl peroxide, difuoryl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, α-methylbenzyl hydroperoxide, α-methyl-α-ethylbenzyl hydroperoxide, Tetralin hydroperoxide, triphenylmethyl hydroperoxide, diphenylmethyl hydroperoxide, α-α-azo-2-methyl butyronitrile, α,α'-2-methyl heptonitrile, 1,1'-azo-1-cyclohexane carbonitrile, dimethyl-α,α'-azoisobutyrate, 4,4'-azo-4-cyanopentanoic acid, azobis(isobutyronitrile), persuccinic acid, diisopropyl peroxy dicarbonate, and the like; a mixture of catalysts may also be used. Azobis(isobutyronitrile) is the preferred catalyst. Generally, from about 0.05% to about 5%, preferably from about 0.1% to about 2%, by weight of catalyst based on the weight of the monomer will be employed in the process of the invention.

In addition to the ingredients mentioned above, a chain transfer agent may be employed in the process of the subject invention. Preferred chain transfer agents are the alkyl mercaptans having from one to twenty carbon atoms in the alkyl chain. Illustrative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, and stearyl mercaptan.

The finely-divided dispersed solids prepared in accordance with the present invention may be separated from the liquid phase by any conventional method including centrifugation, precipitation, solvent evaporation, etc. The preparation of the polymeric solids of the subject invention may be carried out in several ways. Since the polymerization is generally carried out at temperatures below 100°C., a preferred embodiment of the invention is to charge all components to a reactor and apply heat thereto. Optionally, the reaction may be carried out by adding the monomer or a blend of the monomer and catalyst to the other reactants. Also, a portion of the catalyst, chain transferring agent and monomer may be dispersed in a portion of the hydroxy-terminated unsaturation-containing organic compound and added to a reaction vessel containing the remaining portion of the reactants, catalyst, solvent and chain transferring agent. In addition, the catalyst, chain transferring agent and monomer may be combined optionally with a portion of the hydroxy-terminated unsaturation-containing organic compound in a mixing device and thereafter added to a reaction vessel containing the remaining reactants.

The following examples illustrate the nature of the invention. All parts are by weight unless otherwise indicated.

EXAMPLES 1-17

A series of products was prepared by polymerizing a major amount of an ethylenically unsaturated monomer or mixture of monomers in an alcohol and a hydroxy-terminated organic compound containing a polymerizable carbon-to-carbon double bond. In each case, a reaction vessel equipped with a stirrer, thermometer, reflux condenser, inlet and outlet means, nitrogen source and heat exchange means was charged with the alcohol, catalyst monomer(s) and unsaturation-containing organic compound. The charge was heated to 70°C.-80°C. and was then maintained at 70°C.-80°C. for about 5 to 8 hours. Dispersions containing finely-divided particles generally varying in size between 0.1 micron to 5 microns were obtained. In all cases, the free radical catalyst employed was azobis(isobutyronitrile) in an amount equal to 0.5% by weight based on the weight of the ethylenically unsaturated monomer(s). The hydroxy-terminated, unsaturation-containing organic compound employed, hereinafter referred to as HTOC-I, was prepared in the following manner.

Preparation Of HTOC-I

A stainless steel autoclave equipped with a thermometer, stirrer, nitrogen source, inlet means and heat exchange means was charged with 98 parts of maleic anhydride and 4800 parts of a 4800 molecular weight polyol prepared by the reaction of ethylene oxide with the reaction product of propylene oxide with glycerol and propylene glycol (mole ratio of glycol to propylene glycol of 3.2:1), said polyol having an ethylene oxide content of 13% by weight of the polyol and a hydroxyl number of 35. The charge was purged with nitrogen and heated to 175°C. Then, 264 parts of ethylene oxide was gradually added to the reaction mixture over 2 hours. Upon completion of the oxide addition, the reaction mixture was maintained at 175°C. for 7 hours, at which time the reaction mixture was cooled to 25°C. and discharged from the autoclave. The reaction product was stripped at 100°C. for 1 hour under less than 10 millimeters of mercury to remove unreacted ethylene oxide. The product, a clear golden yellow liquid, had a hydroxyl number of 34.3, an acid number of 0.3, a refractive index at 25°C. of 1.4547 and a Brookfield viscosity at 25°C. of 1420 cps.

Details of the preparations of the finely-divided dispersed solids as well as physical characteristics of the resulting products are presented in Table I, below. All of the products of the subject invention are useful in the preparation of polyurethane foams having improved physical properties, particularly tear and tensile strength and load-bearing.

Table I

| Example | HTOC-I Parts | Alcohol Parts | Vinyl Monomer, Parts | | | | Product Appearance |
|---|---|---|---|---|---|---|---|
| | | | St | AN | MMA | VCl$_2$ | |
| 1 | — | E 100 | 65 | 35 | — | — | Polymer lump |
| 2 | 100 | — | 65 | 35 | — | — | Polymer lump |
| 3 | 40 | E 60 | 65 | 35 | — | — | Finely-divided dispersed solids |
| 4 | 25 | E 75 | 65 | 35 | — | — | Finely-divided dispersed solids |
| 5 | 10 | E 90 | 65 | 35 | — | — | Finely-divided dispersed solids |
| 6 | 25 | E 75 | 100 | — | — | — | Finely-divided dispersed solids |
| 7 | 25 | E 75 | — | — | 25 | 75 | Finely-divided dispersed solids |
| 8 | 50 | E 50 | 65 | 35 | — | — | Finely-divided dispersed solids |
| 9 | 5 | E 95 | 100 | — | — | — | Finely-divided dispersed solids |
| 10 | 20 | IP 80 | 12 | — | 16 | 64 | Finely-divided dispersed solids |
| 11 | 17 | IP 83 | 43 | 23 | — | — | Finely-divided dispersed solids |
| 12 | 17 | IP 83 | 66 | — | — | — | Finely-divided dispersed solids |
| 13 | 20 | M 80 | 71 | 29 | — | — | Finely-divided dispersed solids |

Table I-continued

| Example | HTOC-I Parts | Alcohol Parts | Vinyl Monomer, Parts | | | | Product Appearance |
|---|---|---|---|---|---|---|---|
| | | | St | AN | MMA | VCl$_2$ | |
| 14 | 20 | M 80 | 100 | — | — | — | Finely-divided dispersed solids |
| 15 | 20 | t-B 80 | 100 | — | — | — | Finely-divided dispersed solids |
| 16 | 5 | IP 95 | 100 | — | — | — | Finely-divided dispersed solids |
| 17 | 30 | IP 70 | 100 | — | — | — | Finely-divided dispersed solids |

St = Styrene
AN = Acrylonitrile
MMA = Methylmethacrylate
VCl$_2$ = Vinylidene Chloride
IP = Isopropanol
M = Methanol
t-B = t-Butanol
E = Ethanol

EXAMPLES 18–25

A series of products was prepared by polymerizing a major amount of an ethylenically unsaturated monomer or mixture of monomers in an alcohol and a hydroxy-terminated organic compound containing a polymerizable carbon-to-carbon double bond. In each case, the procedure described in connection with the previous examples was followed. The temperature of the reaction was maintained between 65°C. and 80°C. and the time of reaction varied between 5 hours to 8 hours. The catalyst employed was azobis(isobutyronitrile), hereinafter referred to as AIBN. The unsaturation-containing organic compound employed, hereinafter referred to as HTOC-II, was prepared in the following manner.

Preparation Of HTOC-II

A reaction vessel equipped as described in Example 1 was charged with 73.5 parts of maleic anhydride and 5050 parts of a 2240 equivalent weight polyol prepared by capping with ethylene oxide a propylene oxide adduct of trimethylolpropane, said polyol having an oxyethylene content of 15% by weight of the polyol and a hydroxyl number of 25. Following the procedure described in Example 1, 198 parts of ethylene oxide was then added to the charge at 175°C. for a period of 2 hours. The reaction temperature was maintained at 175°C. for 11 hours, cooled to 25°C. and discharged from the vessel. The reaction product was stripped at 100°C. for 1 hour under less than 10 millimeters of mercury. The product, a clear liquid, had a hydroxyl number of 24.5, an acid number of 0.1 and a Brookfield viscosity at 25°C. of 2800 cps. Details of the preparations of the finely-divided dispersed solids as well as physical characteristics of the resulting products are presented in Table II, below. All of the products of the subject invention described in Table II are useful in the preparation of polyurethane foams having improved physical properties.

Table II

| Example | HTOC-II Parts | Alcohol Parts | Vinyl Monomer, Parts | | | | | Catalyst Parts | Product Appearance |
|---|---|---|---|---|---|---|---|---|---|
| | | | St | AN | AA | VCl$_2$ | EHA | | |
| 18 | 20 | P 80 | 65 | 35 | — | — | — | 0.5 | Finely-divided dispersed solid |
| 19 | 20 | M 100 | — | — | — | 80 | 20 | 0.3 | Finely-divided dispersed solid |
| 20 | 10 | IP 90 | — | — | 25 | — | — | 0.4 | Finely-divided dispersed solid |
| 21 | 20 | P 80 | 80 | 20 | — | — | — | 0.2 | Finely-divided dispersed solid |
| 22 | 20 | M 80 | 80 | 20 | — | — | — | 0.2 | Finely-divided dispersed solid |
| 23 | 20 | M 80 | 70 | 20 | — | — | 10 | 0.2 | Finely-divided dispersed solid |
| 24 | 10 | IP 90 | 100 | — | — | — | — | 0.1 | Finely-divided dispersed solid |
| 25 | 5 | IP 95 | 100 | — | — | — | — | 1.0* | Finely-divided dispersed solid |

*Catalyst employed was benzoyl peroxide
St = Styrene
AN = Acrylonitrile
AA = Acrylamide
VCl$_2$ = Vinylidene Chloride
EHA = Ethylhexylacrylate
IP = Isopropanol
M = Methanol

EXAMPLE 26

A. Preparation Of HTOC-III

A stainless steel autoclave equipped with a thermometer, stirrer, nitrogen source, inlet means and heat exchange means was charged with 375 parts of a 325 molecular weight polyol prepared by the condensation in the presence of potassium hydroxide of 4 moles of propylene oxide with 1 mole of glycerol. The charge was purged with nitrogen and heated to 105°C. With constant stirring, a mixture of 4438 parts of propylene oxide and 127 parts (corresponding to 1.0 mole per mole of product) of allylglycidylether was gradually added to the reaction mixture over ten hours. Upon completion of the oxide addition, the reaction mixture was maintained at 105°C. for 4 hours. Thereafter, 870 parts of ethylene oxide was added over a period of 1.5 hours at a temperature of 105°C. After the addition was completed, the reaction mixture was maintained at 105°C. for an additional hour. The reaction mixture was cooled to 30°C. and discharged from the autoclave. The reaction product was treated with an adsorbent, filtered to remove the catalyst and stripped at 100°C. for 1 hour under less than 5 millimeters of mercury to remove volatiles. The product, hereinafter referred to as HTOC-III, was a clear colorless liquid having a hydroxyl number of 37 and an acid number of 0.015.

B. Preparation Of Finely-Divided Dispersed Solid

Following the procedure described in Example 1, 50 parts of HTOC-III, 250 parts of isopropanol and 0.5 part of AIBN was charged to a reaction vessel and the charge was heated to 80°C. While maintaining the temperature of the charge at 80°C., 32.5 parts of styrene, 17.5 parts of acrylonitrile and 0.5 part of dodecylmercaptan was continuously added to the charge over a period of 1 hour. The reaction mixture was then maintained at 80°C. for 5 hours. The resulting product was an opaque white dispersion which upon separation of the alcohol yields a finely-divided white powder.

EXAMPLE 27

A. Preparation Of HTOC-IV

A reaction vessel equipped as described in the previous Examples was charged with 122 parts of toluene diisocyanate and 0.15 part of dibutyltin dilaurate. With good stirring and under a nitrogen flow, the charge was heated to 65°C. where 115 parts of hydroxypropyl methacrylate was added to the vessel over a period of 1 hour maintaining the temperature of the reaction between 65°C.–75°C. After the addition was completed, the reaction was allowed to continue at 65°C. for 30 minutes and thereafter the reaction product was cooled to 30°C. and discharged from the vessel. The product was a clear amber-colored liquid. To a vessel was charged 16 parts of the above-described amber-colored liquid and 450 parts of a 9000 molecular weight polyol prepared by the reaction of ethylene oxide with the propylene oxide adduct of ethylenediamine, said polyol having an oxyethylene content of approximately 20% by weight. The reactants were then heated for 1 hour at 65°C. The resulting product, a clear liquid, is hereinafter referred to as HTOC-IV.

B. Preparation Of Finely-Divided Dispersed Solid

A finely-divided dispersed solid was prepared in the manner described in the previous example employing the following ingredients and amounts thereof:

| Ingredients | Parts, Weight |
|---|---|
| HTOC-IV | 5 |
| Methanol | 95 |
| Styrene | 100 |
| AIBN | 0.1 |

The reaction was carried out for 17 hours at 65°C. A white stable liquid dispersion resulted which upon separation of the methanol yielded a finely-divided white powder.

EXAMPLE 28

A. Preparation Of HTOC-V

A reaction vessel equipped as described in the previous Example was charged with 2637 parts of an 8350 molecular weight polyoxyethylene polyoxypropylene block copolymer prepared by the reaction of ethylene oxide with the propylene oxide adduct of propylene glycol (oxyethylene content of 80% by weight) and 29.4 parts of maleic anhydride. The charge was purged with nitrogen and heated to 175°C. and pressurized with nitrogen to 34 psig. With constant stirring, 79 parts of ethylene oxide was gradually added to the charge over a 2-hour period. Upon completion of the oxide addition the reaction mixture was maintained at 175°C. for 11 hours. The reaction mixture was cooled to 30°C. and discharged from the reactor. The product, hereinafter referred to as HTOC-V, was a clear liquid having a hydroxyl number of 25 and an acid number of 0.01.

B. Preparation Of Finely-Divided Dispersed Solid

A finely-divided dispersed solid was prepared in the manner described in the previous example employing the following ingredients and amounts thereof:

| Ingredients | Parts, Weight |
|---|---|
| HTOC-V | 10 |
| Isopropanol | 90 |
| Styrene | 80 |
| Acrylonitrile | 20 |
| Benzoyl Peroxide | 0.5 |

The reaction was carried out at 65°C. for sixteen hours. A white stable dispersion resulted which upon separation of the isopropanol yields a finely-divided white powder. The powder was suspended in water to give a 5 percent by weight solids suspension and was employed as an opacifier for a light duty liquid dishwashing detergent composition. The resulting composition retained its opacifying property after 3 weeks storage at room temperature.

EXAMPLE 29

A. Preparation Of HTOC-VI

A reaction vessel equipped as described above was charged with 521.4 parts of a 1020 molecular weight propylene oxide adduct of n-butanol and 50.1 parts of maleic anhydride. The charge was purged with nitrogen and heated to 175°C. With good stirring, 89 parts of propylene oxide was continuously added to the charge over a 1-hour period. Thereafter, the reaction mixture was maintained at 175°C. for 11 hours. The reaction mixture was then cooled to 25°C. and discharged from the reactor. The product, hereinafter referred to as HTOC-VI, was a liquid having a Brookfield viscosity at 25°C. of 280 cps. and a hydroxyl number of 48.9.

B. Preparation Of Finely-Divided Dispersed Solid

A finely-divided dispersed solid was prepared in the manner described in the previous Examples employing the following ingredients and amounts thereof:

| Ingredients | Parts, Weight |
|---|---|
| HTOC-VI | 100 |
| Isopropanol | 200 |
| Acrylonitrile | 127.6 |
| Styrene | 22.4 |
| AIBN | 1.5 |

The reaction was carried out at 75°C. for 4 hours. A white stable dispersion resulted which upon separation of the isopropanol yields a finely-divided white powder.

EXAMPLE 30

A finely-divided dispersed solid was prepared by charging 300 parts of ethanol and 100 parts of HTOC- II to a cleaned, dry stainless steel autoclave. Under pressure the charge was heated to 115°C. and whilte maintaining a pressure of from 40 psig.–50 psig., a stream of 70 parts of acrylonitrile, 130 parts of styrene and 2.0 parts of AIBN was gradually added to the charge over a period of 2 hours. Upon separation of the alcohol, a white solid was obtained.

EXAMPLE 31

A. Preparation Of HTOC-VII

A stainless steel autoclave equipped with a thermometer, stirrer, nitrogen source, inlet means and heat exchange means was charged with 5009 parts (1.67 moles) of a 3000 molecular weight polyol prepared by the reaction of propylene oxide with glycerol in the presence of potassium hydroxide. The charge was purged with nitrogen and heated to 103°C. With constant stirring, 245 parts (2.5 moles) of maleic anhydride was then added to the charge maintaining the temperature of the charge at 103°C. for 15 minutes. Then, 290 parts (5.0 moles) of propylene oxide was gradually added to the reaction mixture over 2.5 hours. Upon completion of the oxide addition, the reaction mixture was maintained at 103°C. for 2.5 hours at which time the reaction mixture was cooled to 30°C. and discharged from the autoclave. The reaction product was treated with an adsorbent, filtered to remove the catalyst and stripped at 100°C. for 1 hour under less than 10 millimeters of mercury to remove unreacted propylene oxide. The product, hereinafter referred to as HTOC-VII, a clear golden yellow liquid, had a hydroxyl number of 52.2, an acid number of 0.6, a refractive index at 25°C. of 1.4544 and a Brookfield viscosity at 25°C. of 1200 cps.

B. Preparation Of Finely-Divided Dispersed Solid

A finely-divided dispersed solid was prepared in the manner described in the previous Examples employing the following ingredients and amounts thereof:

| Ingredients | Parts, Weight |
|---|---|
| HTOC-VII | 25 |
| Heptane | 200 |
| Acrylonitrile | 25 |
| Styrene | 25 |
| AIBN | 0.5 |

The reaction was carried out at 75°C. for 5 hours. A white stable dispersion resulted which upon separation of the heptane yields a finely-divided white powder.

EXAMPLE 32

A. Preparation of HTOC-VIII

An autoclave equipped as described above was charged with 196 parts of maleic anhydride and 5100 parts of the 2240 equivalent weight polyol described above in the preparation of HTOC-II. Following the procedure described in connection with Example 1, above, 198 parts of ethylene oxide was then added to the charge at 175°C. for a period of 2 hours. The reaction temperature was maintained at 175°C. for 11 hours, cooled to 25°C. and discharged from the vessel. The reaction product was stripped at 100°C. for 1 hour under less than 10 millimeters of mercury. The product, a clear liquid, had a hydroxyl number of 22.5 and an acid number of 0.1.

B. Preparation Of Finely-Divided Dispersed Solid

A finely-divided dispersed solid was prepared in the manner described in the previous Examples employing the following ingredients and amounts thereof:

| Ingredients | Parts, Weight |
|---|---|
| HTOC-VIII | 25.0 |
| Isopropanol | 150.0 |
| Acrylonitrile | 50.0 |
| Styrene | 75.0 |
| AIBN | 1.25 |

The reaction was carried out at 75°C. for 5 hours. A white stable dispersion resulted which upon separation of the isopropanol yields a finely-divided powder.

EXAMPLES 33–43

Following the procedure described in Example 26, a series of products was prepared by polymerizing a major amount of a mixture of styrene and acrylonitrile in 200 parts of various solvents and in 25 parts of HTOC-II. In all cases, the catalyst employed was azobis(isobutyronitrile), AIBN. The monomers were continuously added to the charge at 80°C. over a period of about 1 hour. The reactions were carried out at 80°C. for about 5 hours. White dispersions were obtained which upon separation of the organic solvent yield a finely-divided white powder. Details of the preparations are presented in Table III, below.

Table III

| Example | Solvent | Vinyl Monomer, Parts St | Vinyl Monomer, Parts AN | Catalyst, Parts | Product Appearance |
|---|---|---|---|---|---|
| 33 | Toluene | 32.5 | 17.5 | 0.25 | Finely-divided dispersed solid. |
| 34 | Dimethylformamide | 25.0 | 25.0 | 0.50 | Finely-divided dispersed solid. |
| 35 | Carbon Tetrachloride | 25.0 | 25.0 | 0.50 | Finely-divided dispersed solid. |
| 36 | Tetrahydrofuran | 25.0 | 25.0 | 0.50 | Finely-divided dispersed solid. |
| 37 | Diethylene Glycol Monomethyl Ether | 25.0 | 25.0 | 0.50 | Finely-divided dispersed solid. |
| 38 | Ethyl Acetate | 25.0 | 25.0 | 0.50 | Finely-divided dispersed solid. |
| 39 | Acetone | 25.0 | 25.0 | 0.50 | Finely-divided dispersed solid. |
| 40 | 2-Nitropropane | 25.0 | 25.0 | 0.50 | Finely-divided dispersed solid. |
| 41 | Acetonitrile | 25.0 | 25.0 | 0.50 | Flnely-divided dispersed solid. |
| 42 | Dimethylsulfoxide | 25.0 | 25.0 | 0.50 | Finely-divided dispersed solid. |
| 43 | Pyridine | 25.0 | 25.0 | 0.50 | Finely-divided dispersed solid. |

The embodiments of the invention in which an exclusive property or privilege is claimed are defined as follows:

1. A finely-divided dispersed solid polymer prepared by polymerizing at a temperature between 25°C. and 180°C. in the presence of from about 0.05 to 5.0 weight percent based on the weight of (a) below of a free radical catalyst and from about one part to nineteen parts by weight per part of (b) below of an organic solvent having a boiling point between 25°C. and 250°C.:
- a. from about 55 to 95 weight percent of an ethylenically unsaturated monomer or mixture of monomers, and
- b. from about 45 to 5 weight percent of a hydroxy-terminated organic compound having from one to eight hydroxyl groups, a hydroxyl equivalent weight of from 500 to 10,000 and containing a polymerizable carbon-to-carbon double bond, said weight percents of (a) and (b) being based on the total weight of (a) and (b).

2. The polymer of claim 1 wherein the ethylenically unsaturated monomer is selected from the group consisting of styrene, acrylonitrile, vinylidene chloride, methylmethacrylate, acrylamide and mixtures thereof.

3. The polymer of claim 1 wherein the ethylenically unsaturated monomer is a mixture of styrene and acrylonitrile.

4. The polymer of claim 1 wherein the ethylenically unsaturated monomer is styrene.

5. The polymer of claim 1 wherein the hydroxy-terminated organic compound is prepared by the reaction of from one to two moles of an organic compound having both ethylenic unsaturation and a hydroxyl, carboxyl or epoxy group with one mole of a hydroxy-containing polyalkylene polyether followed by reaction with an alkylene oxide to yield a compound having an acid number of less than one.

6. The polymer of claim 5 wherein the organic compound having both ethylenic unsaturation and a hydroxyl, carboxyl or epoxy group is maleic anhydride.

7. The polymer of claim 5 wherein the hydroxy-containing polyalkylene ether is an alkylene oxide adduct of trimethylolpropane, glycerol, propylene glycol and mixtures thereof.

8. The polymer of claim 1 wherein the ethylenically unsaturated monomer comprises from 60 to 80 weight percent based on the total weight of monomer and hydroxyterminated organic compound.

9. The polymer of claim 1 wherein the organic solvent is an alkanol.

10. The polymer of claim 1 wherein the alkanol is isopropanol.

11. A process for the preparation of a finelydivided dispersed solid comprising polymerizing at a temperature between 25°C. and 180°C. in the presence of from about 0.05 to 5.0 weight percent based on the weight of (a) below of a free radical catalyst and from about one part to nineteen parts by weight per part of (b) below of an organic solvent having a boiling point between 25°C. and 250°C.:
- a. from about 55 to 95 weight percent of an ethylenically unsaturated monomer or mixture of monomers and
- b. from about 45 to 5 weight percent of a hydroxy-terminated organic compound having from one to eight hydroxyl groups, a hydroxyl equivalent weight of from 500 to 10,000 and containing a polymerizable carbon-to-carbon double bond, said weight percents of (a) and (b) being based on the total weight of (a) and (b).

12. The process of claim 11 wherein the ethylenically unsaturated monomer is selected from the group consisting of styrene, acrylonitrile, vinylidene chloride, methylmethacrylate, acrylamide and mixtures thereof.

13. The process of claim 11 wherein the ethylenically unsaturated monomer is a mixture of styrene and acrylonitrile.

14. The process of claim 11 wherein the ethylenically unsaturated monomer is styrene.

15. The process of claim 11 wherein the hydroxy-terminated organic compound is prepared by the reaction of from one to two moles of an organic compound having both ethylenic unsaturation and a hydroxyl, carboxyl or epoxy group with one mole of a hydroxy-containing polyalkylene polyether followed by reaction with an alkylene oxide to yield a compound having an acid number of less than one.

16. The process of claim 15 wherein the organic compound having both ethylenic unsaturation and a hydroxyl, carboxyl or epoxy group is maleic anhydride.

17. The process of claim 15 wherein the hydroxy-containing polyalkylene ether is an alkylene oxide adduct of trimethylolpropane, glycerol, propylene glycol and mixtures thereof.

18. The process of claim 11 wherein the ethylenically unsaturated monomer comprises from 60 to 80 weight percent based on the total weight of monomer and hydroxy-terminated organic compound.

19. The process of claim 11 wherein the organic solvent is an alkanol.

20. The process of claim 11 wherein the alkanol is isopropanol.

21. A process for the preparation of a finelydivided solid polymer comprising:
- a. polymerizing at a temperature between 25°C. and 180°C. in the presence of from about 0.05 to 5.0 weight percent based on the weight of (a) below of a free radical catalyst and from about one part to nineteen parts by weight per part of
- b. below of an organic solvent having a boiling point between 25°C. and 250°C.:
  1. from about 55 to 95 weight percent of an ethylenically unsaturated monomer or mixture of monomers, and
  2. from about 45 to 5 weight percent of a hydroxy-terminated organic compound having from one to eight hydroxyl groups, a hydroxyl equivalent weight of from 500 to 10,000 and containing a polymerizable carbon-to-carbon double bond, said weight percents of (a) and (b) being based on the total weight of (a) and (b), to obtain a dispersed solid polymer, and
- b. separating said organic solvent from said dispersed solid polymer.

* * * * *